(No Model.)

J. S. REDLINE.
WATER GATE FOR MILLS, CANALS, &c.

No. 306,176. Patented Oct. 7, 1884.

WITNESSES:
N. A. Clark
P. B. Murphi

INVENTOR,
Joseph S. Redline
By R. S. & A. P. Lacey
attys

N. PETERS, Photo-Lithographer, Washington, D. C.

UNITED STATES PATENT OFFICE.

JOSEPH S. REDLINE, OF DERRS, PENNSYLVANIA.

WATER-GATE FOR MILLS, CANALS, &c.

SPECIFICATION forming part of Letters Patent No. 306,176, dated October 7, 1884.

Application filed May 14, 1884. (No model.)

*To all whom it may concern:*

Be it known that I, JOSEPH S. REDLINE, a citizen of the United States, residing at Derrs, in the county of Columbia and State of Pennsylvania, have invented certain new and useful Improvements in Water-Gates for Mills, Canals, &c.; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to gates intended especially for use in the forebays of mills; but it may be applied to canals or other waterways or reservoirs in which sluice-gates are employed.

It consists, essentially, in the forebay or water-way having a water-discharge aperture in its bottom combined with a gate adapted to close said opening and movable longitudinally to and from the same, the upper end of said gate being projected to or above the normal water-level.

It consists, further, in the novel construction of the gate and the particular arrangement of the guiding-standards, all of which will be hereinafter described and claimed.

Figure 1:
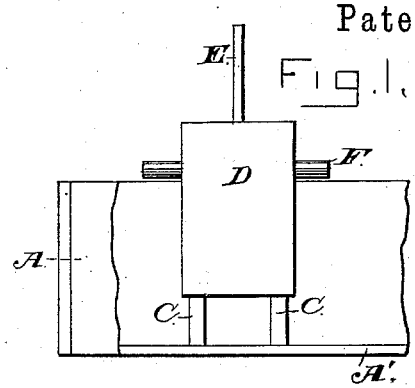
Figure 2:
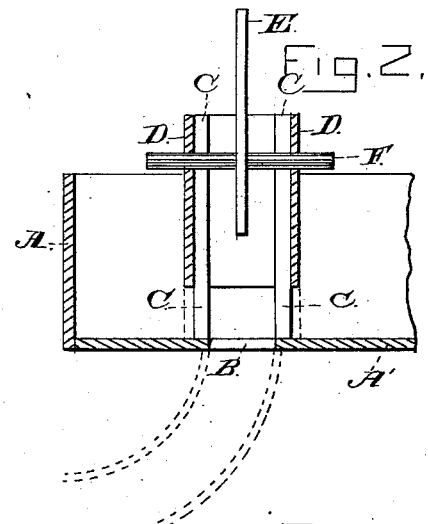
Figure 3:
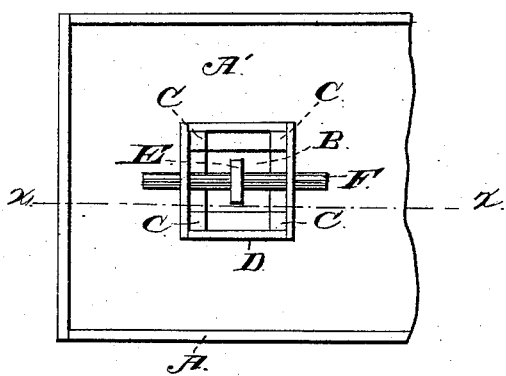

In the drawings, Figure 1 is a side view of a forebay or reservoir, one side of same being broken away. Fig. 2 is a vertical section on line *x x*, Fig. 3. Fig. 3 is a plan view of the discharge end of a forebay provided with my improved gate.

The forebay or penstock A may be of any desired form, and is provided in its bottom A' with the discharge-opening B. The guides or standards C are mounted in the forebay close to the opening B, and are preferably arranged, as shown, so as to fit in the inner corners of the gate D.

This gate is made hollow, as shown, and open at top and bottom. It is placed on the guides C, and movable vertically, so as to admit the water to the discharge B when it is desired to admit water to the mill.

The means employed to raise the gate may be the usual lever, or other desired mechanical expedient, and for convenience in connecting the gate and such operating mechanism I, by preference, provide the connecting-rod E, supported on a cross shaft or rod, F, extended between the sides of the gate, as shown.

In operation, when the gate is lowered to the position indicated in dotted lines, Fig. 2, it will shut the water out from opening B. Now, if the gate be raised to the full position shown in Figs. 1 and 2, the water is admitted to the opening and pours in from all sides, an equal pressure or force being exerted in all directions. By this admission of the water from all sides the water more readily passes out through the discharge-opening and on to the mechanism which it is desired to operate.

The gate being hollow, air is admitted down through it as the water is passing through opening *c*, and this admission of air serves to steady the outflow of water, as will be understood. It is for this, together with other presently-described reasons, I prefer to make the gate hollow and open at both ends.

Except for the foregoing reason, the gate might be made solid or closed at its lower end, and held by guides extended on its outer side. This would involve no departure from the broad principles of my invention; but I prefer to use the hollow gate, as it is light, easily operated, and is more conveniently applied to the guides, as shown.

By forming my gate, as shown, so that the water enters from all sides, the force of said water serves to assist the raising of the gate, rendering the opening of the same easier, as will be appreciated, than gates of ordinary construction.

I make the gate of such height that its upper end will be projected to or above the normal water-level. By so arranging the upper end I obviate the pressure of the volume of water thereon and render the lifting and operation thereof easier, as will be understood. It will be noticed, also, that this arrangement, when the gate is provided with the longitudinal opening, enables the water to pass off through the gate when it rises above the normal or desired level.

Having thus described my invention, what I claim, and desire to secure by Letters Patent, is—

1. The combination, with a forebay or water-way having a water-discharge aperture in its bottom, of a gate adapted to close said opening, substantially as described, and movable longitudinally to and from same, and having its upper end projected to or above the normal water-level, as and for the purposes specified.

2. The combination, with the forebay having a discharge-opening through its bottom, and the guides mounted in the forebay on opposite sides of the opening, of the gate adapted to shut the water off from the opening and held and movable vertically on the guides, said gate being provided with a longitudinal air-passage, substantially as set forth.

3. The combination of the forebay having a discharge-opening, the hollow gate made rectangular in cross-section and open at both ends, and the guides mounted in the forebay and fitting the internal corners of the hollow gate, substantially as set forth.

4. The combination, with the forebay or water-way having a discharge-opening through its bottom, of a gate adapted to shut the water off from the discharge-opening and movable vertically to and from the same, the said gate having its upper end projected above the normal water-level and being provided with a longitudinal air-passage, substantially as set forth.

In testimony whereof I affix my signature in presence of two witnesses.

JOSEPH S. REDLINE.

Witnesses:
JOHN T. ARMS,
A. PARKER.